(12) United States Patent  (10) Patent No.: US 8,441,654 B2
Kurashina  (45) Date of Patent: May 14, 2013

(54) CABLE LABEL FORMING APPARATUS, TAPE PRINTING APPARATUS, METHOD OF FORMING CABLE LABEL FOR CABLE LABEL FORMING APPARATUS AND PROGRAM

(75) Inventor: Hiroyasu Kurashina, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1141 days.

(21) Appl. No.: 12/363,366

(22) Filed: Jan. 30, 2009

(65) Prior Publication Data

US 2009/0231607 A1 Sep. 17, 2009

(30) Foreign Application Priority Data

Mar. 12, 2008 (JP) .................................. 2008-062087

(51) Int. Cl.
*G06K 15/02* (2006.01)

(52) U.S. Cl.
USPC ....... 358/1.11; 358/1.13; 358/1.15; 358/1.16; 400/61; 400/62; 400/65; 400/76; 400/83; 345/533; 345/534; 345/156

(58) Field of Classification Search .................. None
See application file for complete search history.

(56) References Cited

U.S. PATENT DOCUMENTS

| 5,609,424 A | * | 3/1997 | Sakuragi et al. | ............... 400/61 |
| 5,857,789 A | | 1/1999 | Day et al. | |
| 6,276,851 B1 | | 8/2001 | Kurashina | |
| 6,793,422 B2 | | 9/2004 | Kurashina | |
| 7,251,044 B1 | * | 7/2007 | Kurashina | ................... 358/1.11 |
| 8,004,711 B2 | * | 8/2011 | Suzuki et al. | ................ 358/1.16 |
| 2002/0080395 A1 | * | 6/2002 | Kurashina | ................... 358/1.15 |
| 2003/0219300 A1 | | 11/2003 | Kurashina | |
| 2005/0069368 A1 | | 3/2005 | Tanjima et al. | |
| 2005/0117949 A1 | * | 6/2005 | Waldal | ............. 400/76 |
| 2006/0001913 A1 | * | 1/2006 | Akaiwa et al. | ............... 358/3.29 |
| 2009/0231607 A1 | * | 9/2009 | Kurashina | ................... 358/1.11 |

FOREIGN PATENT DOCUMENTS

| EP | 1518698 A1 | 3/2005 |
| EP | 1527890 A1 | 5/2005 |
| JP | 07129363 A | 5/1995 |

OTHER PUBLICATIONS

"TEPRA" PRO SR930, Dec. 2005, first edition, p. 42 (with English translation of relevant portion).

European search report for corresponding European application 09152269.8.

* cited by examiner

*Primary Examiner* — Miya J Cato (74) *Attorney, Agent, or Firm* — DLA Piper LLP (US)

(57) ABSTRACT

Provided herein is a cable label forming apparatus having an edit screen display device, a selection candidate display instructing device, and a selection candidate display device. The selection candidate display device displays a last selected candidate among the plurality of selection candidates on a priority basis in a normal edit screen when displaying the plurality of selection candidates is instructed, and displays a specific candidate among the plurality of selection candidates on a priority basis in a cable label forming edit screen when displaying the plurality of selection candidates is instructed.

8 Claims, 8 Drawing Sheets

| ITEM | FIRST HIERARCHY | SECOND HIERARCHY | THIRD HIERARCHY | FOURTH HIERARCHY |
|---|---|---|---|---|
| SYMBOL A | EUROPE | (CANDIDATE SELECT SCREEN) | | |
| | LATIN AMERICA | | | |
| | GREEK | | | |
| | : | | | |
| | HOSPITAL | | | |
| | END? | | | |
| SYMBOL B | ABBREVIATION | (CANDIDATE SELECT SCREEN) | | |
| | MARK | | | |
| | TWO-DIGIT NUMBER | (TENTHS DIGIT SECECT SCREEN) | (ONES DIGIT SECECT SCREEN) | |
| | WORK | (CANDIDATE SELECT SCREN) | | |
| | : | | | |
| | FAMILY | | | |
| | END? | | | |
| BAR CODE | CODE128 | (ENTIRE WIDTH SELECT SCREEN) | (THINNESS/THICKNESS RATIO SELECT SCREEN) | (CHECK DIGIT SELECT SCREEN) |
| | CODE39 | | | |
| | : | | | |
| | ITF | | | |
| | END? | | | |

| ITEM | FIRST HIERARCHY | SECOND HIERARCHY | THIRD HIERARCHY | FOURTH HIERARCHY | FIFTH HIERARCHY |
|---|---|---|---|---|---|
| ENVIRONMENT SETTING | DISPLAY DENSITY | (OMITTED) | | | |
| | PRINT DENSITY | | | | |
| | SAVED VALUE RESTORATION | | | | |
| | SAVED VALUE SETTING | | | | |
| | PRIORITY DISPLAY | NORMAL/ CABLE | SYMBOL A | NOT FIX | |
| | | | | FIX | EUROPE |
| | | | | | LATIN AMERICA |
| | | | | | GREEK |
| | | | | | : |
| | | | | | HOSPITAL |
| | | | SYMBOL B | NOT FIX | |
| | | | | FIX | ABBREVIATION |
| | | | | | MARK |
| | | | | | TWO-DIGIT NUMBER |
| | | | | | WORK |
| | | | | | : |
| | | | | | FAMILY |
| | | | BAR CODE | NOT FIX | |
| | | | | FIX | CODE128 |
| | | | | | CODE39 |
| | | | | | : |
| | | | | | ITF |
| | END? | END? | END? | | |

CABLE LABEL FORMING APPARATUS, TAPE PRINTING APPARATUS, METHOD OF FORMING CABLE LABEL FOR CABLE LABEL FORMING APPARATUS AND PROGRAM

The entire disclosure of Japanese Patent Application No. 2008-062087, filed Mar. 12, 2008, is expressly incorporated by reference herein.

BACKGROUND

1. Technical Field

The present invention relates to a cable label forming apparatus which displays a plurality of select candidates on a screen and uses one of the plurality of selection candidates in an edit process, a tape printing apparatus, a method of forming a cable label for a cable label forming apparatus and a program.

2. Related Art

In a cable label forming apparatus and the like, a priority display method is known. In the method, a last selected candidate is displayed preferentially on a top part or highlighted when a select screen for selecting one of a plurality of selection candidates is displayed. For example, in a tape printing apparatus disclosed in a manual of "TEPRA" PRO SR930, December 2005, first edition, page 42, when an item "symbol" is selected, a plurality of symbol menus are displayed on the screen. In this case, a menu of the symbol and the symbol once selected are displayed preferentially on the first list (on the top part) in a next operation (a learning function). In general, as the candidate once selected and candidates around thereof has high possibility to be selected continuously, it is convenient to have the function by which the last selected candidate is stored and used for a next priority candidate display. Especially, in a case that a number of candidates exist or the display screen is small, it is necessary to visually check selected candidates which are not displayed on the screen by moving a cursor. Therefore, the priority display for displaying the last selected candidate which has high possibility to be selected is very effective.

On the other hand, in some cases, the priority display for displaying the last selected candidate is not necessarily effective depending on edit content or select content. For example, in a case that a cable label attached on a cable is formed, the label is usually printed with date, a production number and an identification number of an electronic device. It is desirable to display preferentially a "two-digit number (a function capable of dealing two-digit number as one character)" regardless of the last selected candidate, when the "two-digit number" is included in selection candidates in the item "symbol". However, in the related cable label forming apparatus or the tape printing apparatus, priority display types (the priority display which displays the last selected candidate and the other priority display which displays a specific selection candidate) are not set adequately based on the edit content, thereby it sometimes takes time to select the candidate.

SUMMARY

An advantage of some aspects of the invention is that there is provided a cable label forming apparatus, a tape printing apparatus, a method of forming a cable label for a cable label forming apparatus and a program for enhancing convenience for a user's operation when one of a plurality of candidates is selected for editing.

According to an embodiment of the invention, there is provided a cable label forming apparatus having an edit screen display device which displays either one of a normal edit screen and a cable label forming edit screen for a label which is adhered to a cable and having an edit condition different from that of the normal edit screen, a selection candidate display instructing device which instructs displaying a plurality of selection candidates for performing at least one of a function selection and an input information selection in each of the edit screens and a selection candidate display device which displays the plurality of selection candidates according to the instruction of the selection candidate display instructing device. The selection candidate display device displays a last selected candidate among the plurality of selection candidates on a priority basis in the normal edit screen when displaying the plurality of selection candidates is instructed, and displays a specific candidate among the plurality of selection candidates on a priority basis in the cable label forming edit screen when displaying the plurality of selection candidates is instructed.

According to an embodiment of the invention, there is provided a cable label forming method for a cable label forming apparatus displaying at least two types of edit screens having different edit conditions, the cable label forming method executing edit screen setting which sets either one of the two types of edit screens, and selection candidate displaying which displays a plurality of selection candidates for performing at least one of a function selection and an input information selection in each of the edit screens. A last selected candidate is displayed on a priority basis among the plurality of selection candidates when the plurality of selection candidates are displayed in one of the two types of the edit screens, and a specific candidate is displayed on a priority basis among the plurality of selection candidates when the plurality of selection candidates are displayed in the other of the two types of the edit screens in the selection candidate displaying.

With these configurations, it is possible to determine which candidate is displayed on a priority basis which is a last selected candidate or a specific candidate among a plurality of selection candidates according to edit screens having different edit conditions. Therefore, it is possible to enhance convenience for a user's operation when one of the plurality of selection candidates is selected for edition. In short, in a case such that making a document for printing a cable label, a selection candidate "two-digit number" (the specific selection candidate) is displayed on a priority basis in an edit screen (the cable label forming edit screen) in which the "two-digit number" is processed frequently when a display instruction for a symbol menu. The last selected candidate is displayed on a priority basis in a normal edit screen because there is a high possibility that the once selected candidate or a candidate around the selected candidate is generally selected. Thus, an adequate selection candidate is displayed on a priority basis according to edit content. Therefore, it does not take time when a desired candidate is selected among the plurality of selection candidates because the adequate selection candidate is displayed on a priority basis according to the edit content.

In this case, it is preferable that a priority display type setting device which sets either one of a priority display fixed type displaying the specific candidate among the plurality of selection candidates on a priority basis and a priority display variable type displaying the last selected candidate among the plurality of selection candidates on a priority basis in each of the edit screens is further provided. The selection candidate display device displays on a priority basis based on a setting of the priority display type setting device when the plurality of selection candidates are displayed in a case that the priority display type setting device is set.

With this configuration, it is possible to set the priority display type per edit screen according to a use's needs (preference or usage environment). Note that, in a state where the priority display type setting device is not set (a default setting state), the last selected candidate is displayed on a priority basis when the plurality of selection candidates are displayed in the normal edit screen, and the specific candidate is displayed on a priority basis when the plurality of selection candidates are displayed in the cable label forming edit screen.

In this case, it is preferable that the plurality of selection candidates are prepared by item, the selection candidate display instructing device is capable of instructing to display the plurality of selection candidates by designating either one of items, and the priority display type setting device sets the priority display fixed type or the priority display variable type by item.

With this configuration, in a case that there are a plurality of items in which the plurality of selection candidates can be displayed in each of the edit screens, it is possible to set the priority display fixed type or the priority display variable type by these items. Thus, more detailed priority display settings are made in accordance with the user's needs.

In this case, it is preferable that the priority display type setting device further sets the specific candidate in a case that the priority display fixed type is set.

With this configuration, it is possible to set the specific candidate to be displayed on a priority basis. Thus, more detailed priority display settings are made in accordance with the user's needs.

In this case, it is preferable that the selection candidate display instructing device is capable of instructing to display a plurality of lower selection candidates as a lower hierarchy corresponding to the selected candidate by a selection operation in which one of candidates is selected among the plurality of selection candidates, and the selection candidate display device displays the last selected candidate on a priority basis for the plurality of lower selection candidates regardless of the priority display type of the edit screen with which display instruction for the plurality of selection candidates is made.

With this configuration, the last selected candidate is displayed on a priority basis for lower selection candidates in a lower hierarchy regardless of an edit screen to be instructed to display the plurality of selection candidates or the priority display type of respective items, leading detailed settings being unnecessary. Consequently, operations are easily understood by setting lower selection candidates in the priority display variable type equally.

Note that the priority display in the lower selection candidates defined here is directed to a priority display method at least in a default setting state as same as the priority display for the above plurality of priority candidates. It may be possible to have a configuration in which the priority display fixed type or the priority display variable type can be set by edit screen and/or by item in terms of the lower selection candidates.

According to an embodiment of the invention, there is provided a tape printing apparatus having each of devices in the cable label forming apparatus described above, a print data generating device which generates a print data based on an edit result in each of edit screens, and a print device which prints the print data on a tape.

With this configuration, it is possible to enhance convenience for a user's selection operations when a print data printed on a tape is edited.

In this case, it is preferable that the cable label forming edit screen is used for forming a cable label adhered to a cable, the plurality of selection candidates are symbol menus of a plurality of types, and that the specific candidate is a candidate which is used for inputting two-digit number capable of processing two-digit number as one character.

With this configuration, in a case that a cable label is formed, it is possible to enhance the user's convenience by display the specific candidate "two-digit number" on a priority basis in an edit screen for forming the cable label because the "two-digit number" in a symbol menu is apt to be used.

Note that the "label" is formed by printing on the tape and by cutting off a printed portion thereof. A cutting-off device mounted on the tape printing apparatus may be used for cutting off the tape or the user may use scissors.

According to an embodiment of the invention, there is provided a program which causes a computer to function as respective steps in the cable label forming method for the cable label forming apparatus described above.

With this configuration, it is possible to enhance the user's operation when one of the plurality of selection candidates in the cable label forming apparatus is selected for edition.

BRIEF DESCRIPTION OF THE DRAWINGS

The invention will be described with reference to the accompanying drawings, wherein like numbers reference like elements.

DESCRIPTION OF EXEMPLARY EMBODIMENTS

With reference to the accompanying drawings, one embodiment of the invention will be described below in detail. In this embodiment, a tape printing apparatus is exemplified which performs series of processes from information input to printing on a tape-like medium as an electronic apparatus applied with a cable label forming apparatus.

Figure 1:
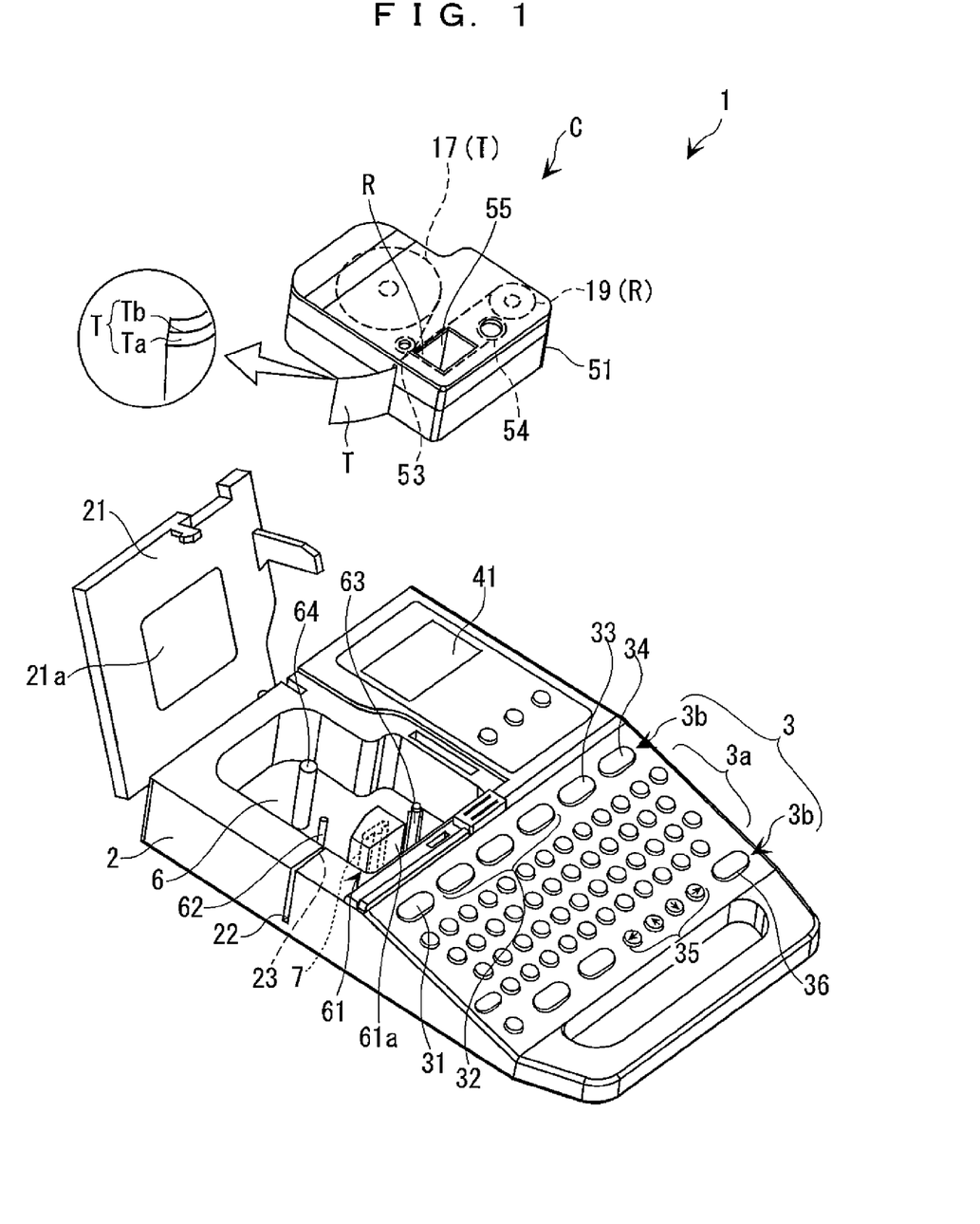
FIG. 1 is a perspective view of a tape printing apparatus having its cover opened.

FIG. 1 is an external perspective view of a tape printing apparatus 1 according to the embodiment in a state that an opening and closing cover 21 thereof is opened. As shown in FIG. 1, an external shape of the tape printing apparatus 1 is formed by a printer case 2. In an upper front portion of the printer case 2, a keyboard 3 including various input keys is disposed. In a left side of an upper rear portion thereof, the opening and closing cover 21 is provided and in a right side thereof, a display screen 41 is provided. Inside the opening and closing cover 21, a cartridge mounting section 6 for mounting a tape cartridge C is formed in a hollow shape. The tape cartridge C is detachably mounted in the cartridge mounting section 6 with a state in which the opening and closing cover 21 is opened. Moreover, on the opening and closing window 21, there is formed an observation window 21*a* for viewing the mounting and non-mounting of the tape cartridge C in a state that the opening and closing cover 21 is closed.

On the keyboard 3, a character key group 3*a* and a function key group 3*b* for designating various operating modes and the like are arranged. The character key group 3*a* has a full key arrangement based on Japanese Industrial Standards (JIS) sequence and includes a shift key for suppressing increase in the number of keys to be operated, similar to a general word processor or the like. Moreover, the function key group 3*b* includes: a cable key 31, an edit item key group 32, an environment key 33, a print key 34, cursor keys 35 and a return key 36.

The cable key 31 is used for switching a normal edit mode for a normal edit and the other edit mode, a cable edit mode in which a label L (referred as a "cable label L" hereinafter) to be adhered to a cable or a cord is formed. An edit screen to be displayed in the normal edit mode is referred to a "normal edit screen 41*a*" and the other edit screen to be displayed in the cable edit mode is referred to a "cable edit screen 41*b*" (the cable label forming edit screen) (see FIG. 2).

Figure 2:
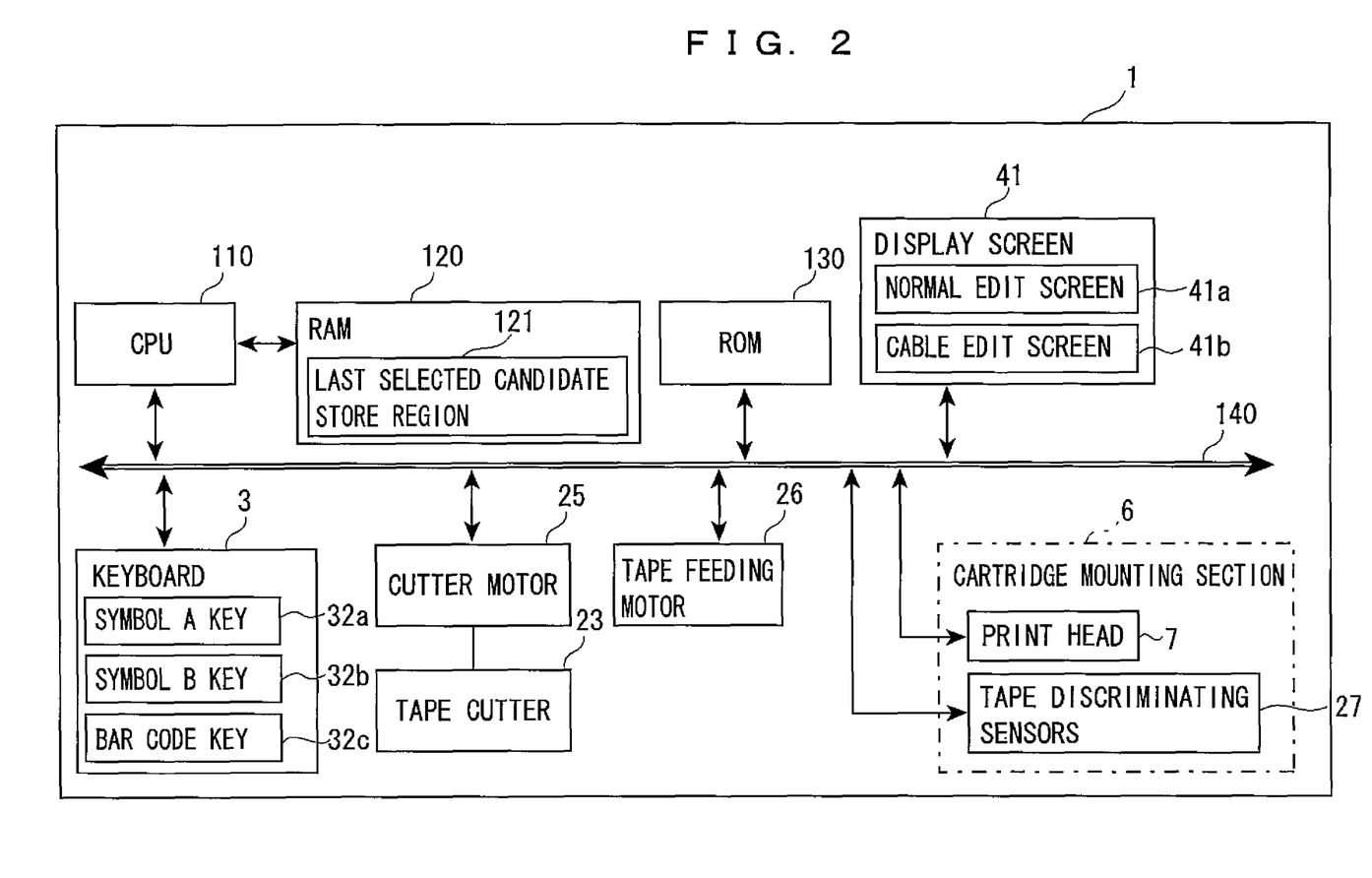
FIG. 2 is a control block diagram of the tape printing apparatus.

The edit item key group 32 is used for selecting one of the edit functions and includes a symbol A key 32*a*, a symbol B key 32*b*, and a bar code key 32*c* (see FIG. 2). Edit functions shown in FIG. 4 can be selected by depressing one of these keys. The environment key 33 is used for setting an environment and can select environment set functions shown in FIG. 7. The print key 34 is used for instructing printing execution. The cursor keys 35 include an up (↑)/a down (↓)/a left (←)/a right (→) keys and are used for a cursor movement and a scroll operation. The return key 36 is used for selecting a selection candidate (an alternative) and for determining which operation should be operated.

The display screen 41 is a liquid crystal display and is used by the user when the edit result based on an input information input with the key board 3 by the user and print data or the like generated based on the edit result are checked. In this embodiment, the display screen 41 has a size of two lines in a vertical direction and seven characters in a horizontal direction (see FIG. 8).

At a left side of the printer case 2, a tape ejecting slot 22 is formed which communicates the cartridge mounting section 6 with outside. A tape cutter 23 for cutting off a transmitted print tape T faces to the tape ejecting slot 22. A predetermined length of the printed print tape T is transmitted from the tape ejecting slot 22 and the printed print tape T is cut off with the tape cutter 23 in a state that the transmission is in halt, thereby a label L in a strip form (see FIG. 6) is formed. Note that, in terms of the cutting off process, an auto cut mode and a manual cut mode can be used switchably. A cutter motor 25 (see FIG. 2) is driven in the auto cut mode for a fixed length printing, and in the manual cut mode for an arbitrary length printing by the user's operation of a cut key.

On the other hand, the cartridge mounting section 6 has a head unit 61 having a thermal type print head 7 in a head cover 61*a*, a platen drive shaft 62 facing to the print head 7, a take-up drive shaft 63 for taking up a later described ink ribbon R, and a positioning boss 64 for a later described tape reel 17. At a lower side of the cartridge mounting section 6, a tape feeding motor 26 (see FIG. 2) rotating the platen drive shaft 62 and the take-up drive shaft 63 is provided.

The tape cartridge C has a tape reel 17 wound with the print tape T having a given width (about 4.5 mm-48 mm) at an upper center portion inside the cartridge case 51, and a ribbon reel 19 wound with the ink ribbon R at a right lower portion thereof. The print tape T and the ink ribbon R have the same width. A through opening 55 is formed in which a head cover 61*a* covering the head unit 61 is inserted at a left lower portion of the tape reel 17. The through opening 55 is inserted on the head unit 61, and in a portion where the print tape T and the ink ribbon R are overlapped with each other, a platen roller 53 which is inserted on the platen drive shaft 62 to be rotatably driven is provided. On the other hand, a ribbon take-up reel 54 is arranged in conjunction with the ribbon reel 19. The ink ribbon R paid out from the ribbon reel 19 is arranged so as to surround the head cover 61*a* and to be wound up on the ribbon take-up reel 54.

When the tape cartridge C is mounted on the cartridge mounting section 6, the through opening 55 is inserted on the head cover 61*a*, the center hole of the tape reel 17 is inserted on the positioning boss 64, and the center hole of the ribbon take-up reel 54 is inserted on the take-up drive shaft 63, respectively. The print head 7 comes in contact with the platen roller 53 to sandwich the print tape T and the ink ribbon R, leading to be capable of printing. Then, the user inputs a desired text (a character, a number, a symbol, a character of a simplified graphic or the like) or an image with the key board 3 while checking the edit result displayed on the display screen 41. When the user instruct to print, the tape printing apparatus 1 pays out the print tape T from the tape cartridge C with the tape feed motor 26 and prints as the user wishes on the print tape T by heating heater elements of the print head 7 selectively. A printed portion of the print tape T is transmitted to outside via the tape ejecting slot 22 as needed. After completion of printing, the tape feed motor 26 transmits the print tape T to a position of a tape length including a margin and stops the transmission (then, the cutting off process is performed).

The print tape T has a record tape Ta formed with an adhesive layer on the back side thereof and a peel tape Tb adhered to the record tape Ta by the adhesive layer. The print tape T is contained in the cartridge case 51 in a state that the print tape T is wound in a roll fashion having the record tape Ta outwardly and the peel tape Tb inwardly. Various types (a tape width, a base color, a background image, material (texture) and the like) of print tapes T are prepared, and each of the cartridge cases 51 includes one type of the print tapes T (and the corresponding ink ribbon R). At a rear side of the cartridge case 51, a plurality of holes (not shown) are formed specifying the type of the tape cartridge C. A plurality of tape discriminating sensors (for instance, micro switches) 27 (see FIG. 2) for detecting the holes are provided in the cartridge mounting section 6 corresponding to the plurality of holes. It is possible to discriminate the tape type by detecting a state of the plurality of holes with the tape discriminating sensors 27.

A control structure of the tape printing apparatus 1 will be described with reference to a control block diagram shown in FIG. 2. The tape printing apparatus 1 has a CPU (Central Processing Unit) 110, a RAM (Random Access Memory) 120, a ROM (Read Only Memory) 130, the display screen 41, the key board 3, the cutter motor 25, the tape cutter 23, the tape feeding motor 26, the print head 7 and the tape discriminating sensors 27. The CPU 110 is connected to the ROM 130, the display screen 41, the key board 3, the cutter motor 25, the tape feeding motor 26, the print head 7 and the tape discriminating sensors 27 via a bus 140.

The RAM 120 is directly connected to the CPU 110 and is used as a work area when the CPU 110 performs various controls. The RAM 120 has a last selected candidate store region 121 which stores a candidate previously selected (referred as a "last selected candidate") among the plurality of selection candidates for selecting various edit functions. The last selected candidate store region 121 stores the last selected candidate per the edit item and per selection candidate group (a plurality of selection candidates) included in each of the edit items. As each of the selection candidate groups has a hierarchy structure (see FIG. 4), regarding the edit item "symbol A" for example, last selected candidates are stored for a selected candidate group in the first hierarchy belonging to the "symbol A" (a symbol menu) and for a selected candidate group in the second hierarchy belonging to the first hierarchy of "Europe", respectively. Last selected candidates are stored for each of the select items other than "Europe" in the first hierarchy.

The ROM 130 stores a control program and a control data with which the CPU 110 can perform various controls. More specifically, a display control program for controlling display of the display screen 41, an edit process program for various edit processes, and a print process program for printing are included.

The display screen 41 functions as display device for displaying the edit result and a print layout. As described above, either the normal edit screen 41a or the cable edit screen 41b is displayed as edit screen (edit screen display device). The cable edit screen 41b differs from the normal edit screen 41a in that: the number of lines which can be input (two lines with the tape length of "2.6 cm", four lines with the tape length of "5.0 cm", etc) and the number of characters (four characters in full size with the print tape T of 4 mm tape width, etc) are limited; fonts, decorations, font types, character direction (vertical writing/horizontal writing) are fixed and can not be changed; and the "bar code" (see FIG. 4) as edit item can not be selected.

The key board 3 functions as information input device for inputting various data and as assigning/setting device for various assigning and settings. The key board 3 has the symbol A key 32a, the symbol B key 32b and the bar code key 32c as edit item key group 32 (selection candidate display instructing device) as described above.

The cutter motor 25 is connected to the tape cutter 23 and functions as cutting-off device. The tape feeding motor 26 and the print head 7 function as print device for printing on the print tape T. As described above, the print head 7 and the tape discriminating sensors 27 are provide on the cartridge mounting section 6, and the tape discriminating sensors 27 detect the type of the print tape T contained in the tape cartridge C. The CPU 110 determines whether the mounted tape cartridge C (the tape width and the material of the print tape T contained in the tape cartridge C, etc) is appropriate for forming the cable label L, and controls to limit the number of lines and characters to be input as text, and the like. The CPU 110 also controls a display process of the display screen 41 and a generate process of print data (a print data generating device), and performs drive control for a printing action and a cut off action.

Further, the CPU 110 performs a priority display control which displays preferentially one of the candidates among the selection candidate group displayed by depressing the edit item key 32a, 32b or 32c (a selection candidate display device). Note that the "priority display" means that the candidate among the selection candidate group is displayed preferentially first (on the top rank) in order as candidate which can be selected first, or is highlighted (highlighted display shown in D12 or blink display shown in D13 in FIG. 8). All candidates of the selection candidate group may be displayed on a same screen, or one of the selection candidates may be displayed on a screen and may be changed sequentially with the operation of the cursor keys 35 shown in D12 in FIG. 8.

For example, the CPU 110 displays preferentially the last selected candidate among the selection candidate group in the first hierarchy regardless of the type of the edit item key (the symbol A key 32a, the symbol B key 32b and the bar code key 32c) when one of the edit item key group 32 is depressed with a state that the normal edit screen 41a is being displayed. In this case, the CPU 110 determines which candidate should be preferentially displayed by referencing the last selected candidate store region 121 in the RAM 120. On the other hand, when the symbol B key 32b is depressed in a state that the cable edit screen 41b is being displayed, a candidate "two-digit number" is preferentially displayed among the selection candidate group of the first hierarchy regardless which candidate was previously selected. Thus, the CPU 110 changes a priority display type (a method of determining the candidate which is a target for the priority display) whether the last selected or the specific candidate should be preferentially displayed according to the type of the edit screen or edit content. In other words, the user can quickly operate to select a desired candidate among the plurality of selection candidates because an appropriate selection candidate suited for the edit content, etc is displayed preferentially. The above priority display control is a control in a default setting (an initial value) state. A specific candidate to be the priority display candidate and the priority display type may be changed by the user's setting (a priority display type setting device), which is described later.

Figure 3A:
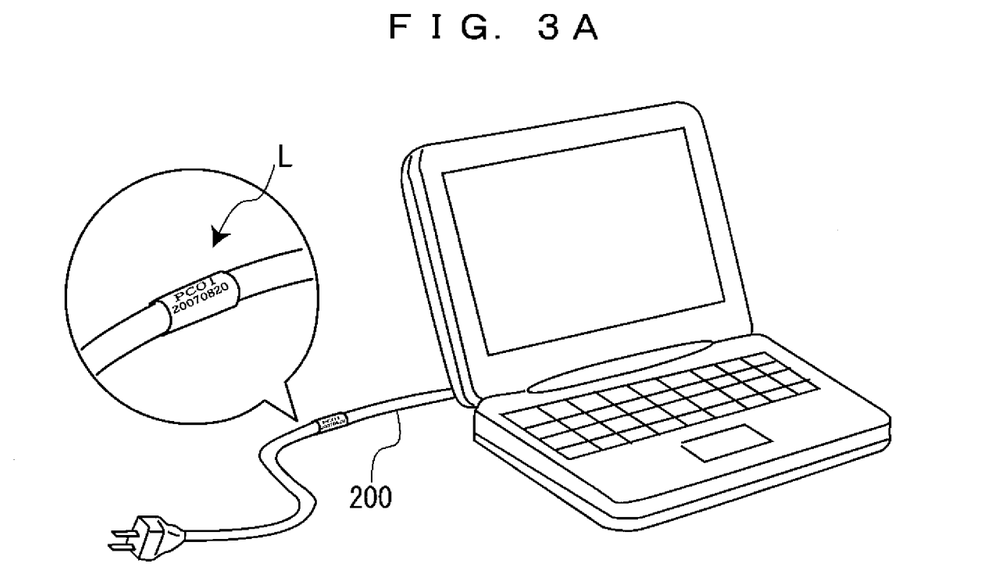
FIGS. 3A and 3B show attaching example of a cable label.
Figure 3B:
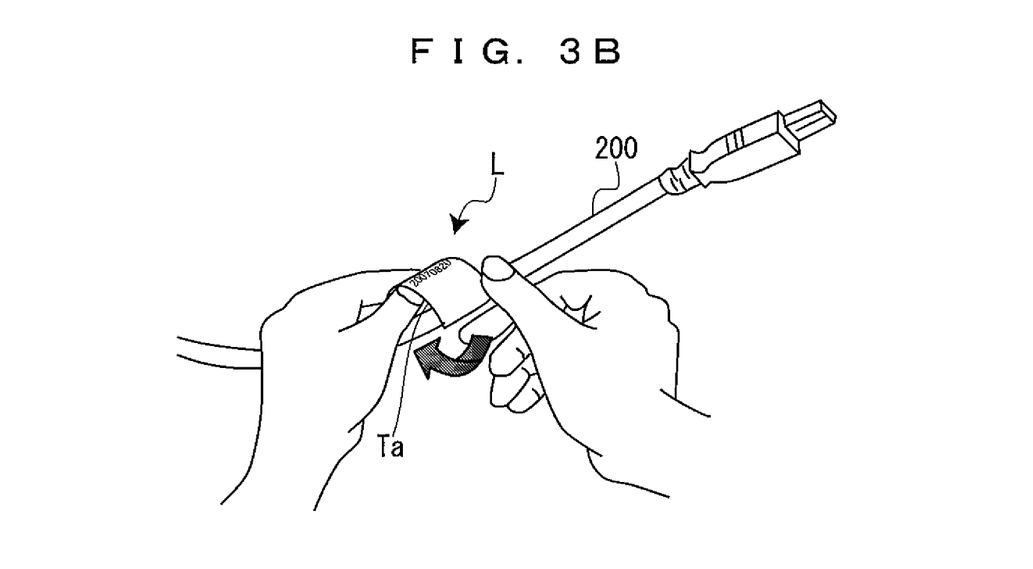

Referring to FIGS. 3A and 3B, an adhesion example of the cable label L formed with the cable edit screen 41b will be explained. As shown in FIG. 3A, on the cable label L, several lines with character strings along a width direction as line direction are printed in a horizontal writing. The cable label L is used to be wound up on an attached object 200 such as a power code or the like. When the cable label L is wound up on the attached object 200, the peel tape Tb is peeled off, and the record tape Ta is turned to an obverse side. Then as shown in FIG. 3B, a tip portion of the record tape Ta is adhered once on the attached object 200, a rear end portion of the record tape Ta is held with fingers, and the record tape Ta is adhered on the attached object 200 to surround therearound (along an arrow direction in FIG. 3B).

Figure 4:
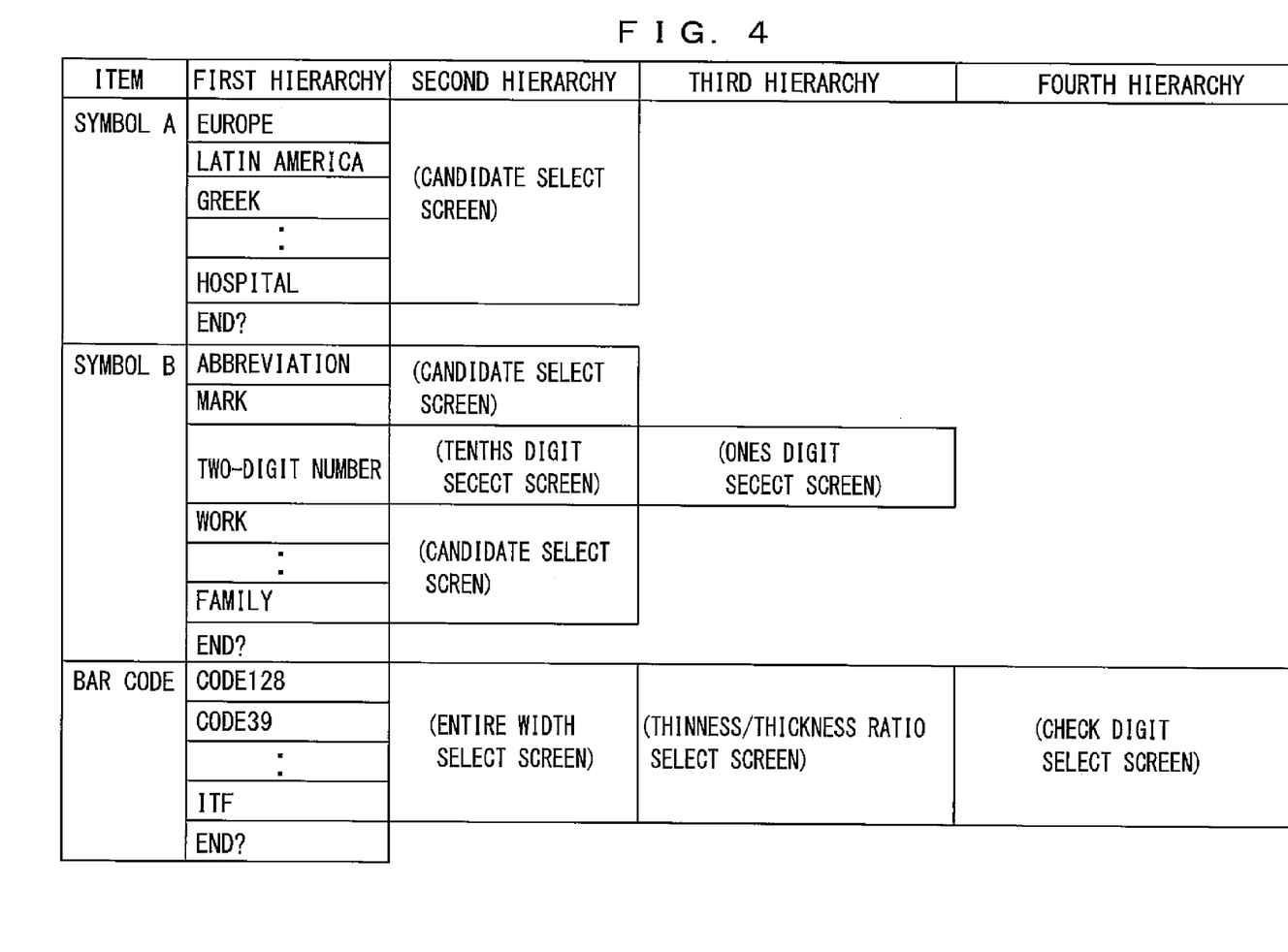
FIG. 4 is a table of selection candidates for an edit function.

Referring to a table shown in FIG. 4, the selection candidates in the edit function will be described. As above, in the edit items "symbol A", "symbol B" and "bar code", the selection candidate group of the first hierarchy belonging thereto can be displayed on the display screen 41 when the symbol A key 32a, the symbol B key 32b and the bar code key 32c are depressed, respectively. In the normal edit mode (the normal edit screen 41a), all of these edit items can be selected, whereas, in the cable edit mode (the cable edit screen 41b), the edit item "bar code" can not be selected. Each of the selection candidate groups (including lower hierarchies below the first hierarchy) is displayed cyclically (cyclic display) by the operation with the cursor keys 35.

For example, in the selection candidate group ("Europe", "Greek", etc) of the first hierarchy belonging to the edit item "symbol A", a selection candidate group of the lower hierarchy belonging to each of the candidates can be displayed on the display screen 41 by selecting one of the candidates belonging to the first hierarchy. As for the edit item "symbol A", the second hierarchy is final. When the candidate in the final hierarchy is selected, the edit screen is displayed. The edit item "symbol A" is set as default such that the last selected candidates in all of the selection candidate groups are displayed preferentially regardless of the edit mode and the hierarchy.

When an initialization is performed and thereby the last selected candidate does not exist, a default value ("Europe" in the first hierarchy) on the top rank in each of the selection candidate groups is displayed preferentially. A selection candidate "end?" is selected when a select content is reflected in the edit content or the screen is switched to a select screen of the upper hierarchy, and can not be an object to be stored in the last selected candidate store region 121 as a last selected candidate. Regarding these (the priority display when the last selected candidate does not exist and the function of the selection candidate "end?"), those of the edit items "symbol B and "bar code" are the same.

On the other hand, in terms of the edit item "symbol B", when the selection candidate "two-digit number" of the first hierarchy belonging to the "symbol B" is selected, it is possible to select in the second and the third hierarchies. A tenths digit of the two-digit number is selected in the second hierarchy, and a ones digit thereof is selected in the third hierarchy. When the selection candidate group (an "abbreviation", a "mark", and the like) belonging to the "symbol B" is displayed in the cable edit mode, the "two-digit number" set as specific candidate in the default setting is displayed preferentially. On the other hand, the last selected candidates are displayed preferentially in the selection candidate groups of the second and the third hierarchies. When the selection candidate group belonging to the "symbol B" is displayed in the normal edit mode, the last selected candidates are displayed preferentially. Regarding the selection candidate groups of the second hierarchy displayed when selection candidates other than the "two-digit number" belonging to the edit item "symbol B" are selected, the last selected candidates are preferentially displayed regardless of the edit mode.

Regarding all of the selection candidates ("CODE 128", "CODE 39", etc) belonging to the first hierarchy in the edit item "bar code", it is possible to select in the second through the fourth hierarchies. An overall width (a length in a horizontal direction of the bar code) is selected in the second hierarchy, a ratio of thinness/thickness (line width of each of lines constituting a bar code) is selected in the third hierarchy, and an existence or non-existence of a check digit is selected in the fourth hierarchy, respectively. The edit item "bar code" can be selected only in the normal edit mode, and all of the selection candidate groups are set by default so as to display the last selected candidates preferentially.

Figure 5:
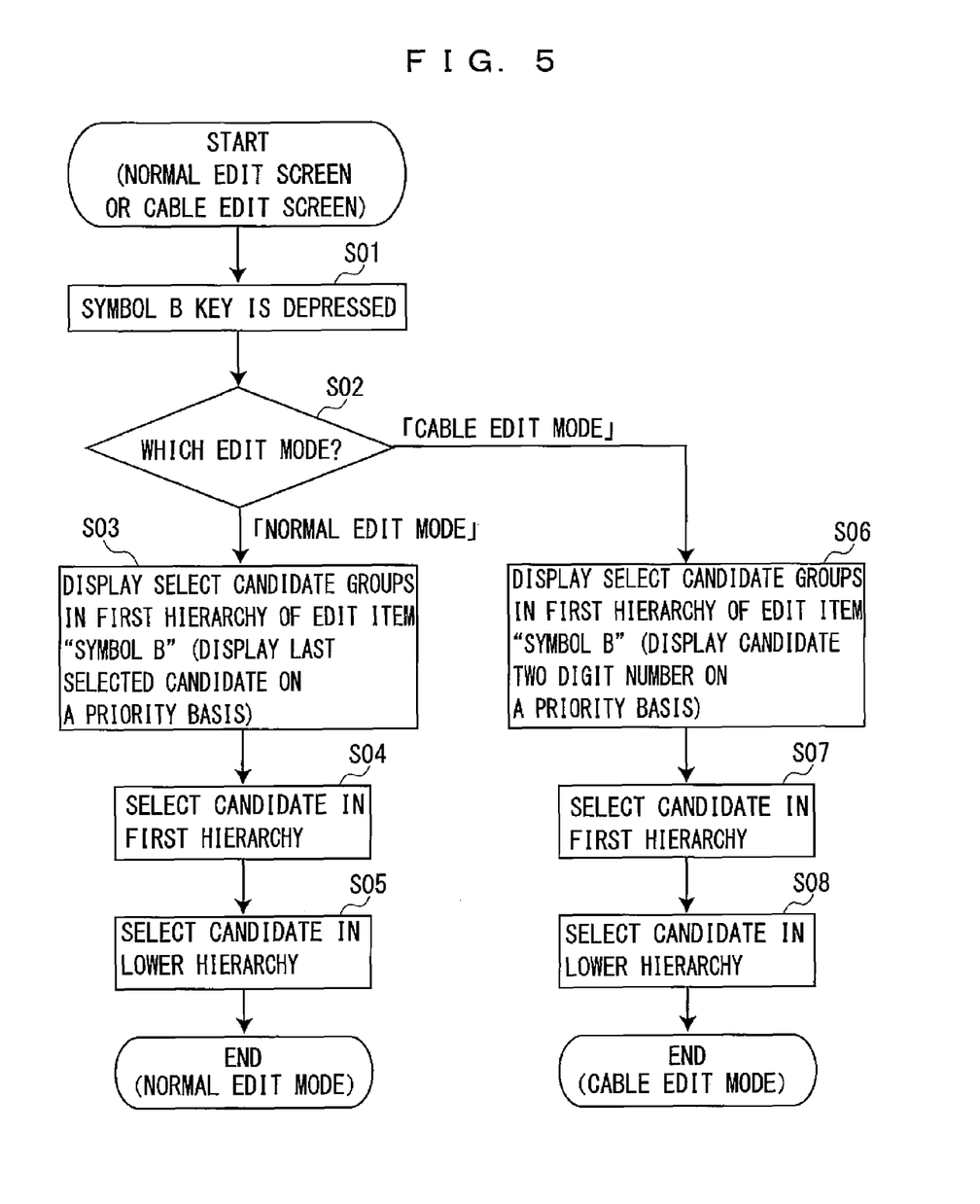
FIG. 5 is a flow chart showing a method of operation in which two-digit number is input in a normal edit mode and a cable edit mode.

With a flow chart shown in FIG. 5, a select operation for the edit function will be described. When the symbol B key 32b is depressed in a state that the normal edit screen 41a or the cable edit screen 41b is displayed on the display screen 41 (S01), the edit mode at the time is detected (S02). When the normal edit mode is detected (S02: the normal edit mode), the last selected candidate is displayed preferentially among the first hierarchy selection candidate groups belonging to the edit item "symbol B". The last selected candidate is read out from the last selected candidate store region 121. When the initialization is performed and the last selected candidate in the selection candidate groups belonging to the edit item "symbol B" is not stored, the default value, the "abbreviation" is displayed preferentially. Then, the candidate in the first hierarchy of the edit item "symbol B" is selected (S04) by the operation with cursor keys 35 or the return key 36, and selections in the lower hierarchies are performed (S05). After all, the normal edit screen 41a is displayed. A stored value of each of the selection candidate groups in the last selected candidate store region 121 is updated, with the select operation in S04 and S05.

On the other hand, in S02, when the cable edit mode is detected (S02: the cable edit mode), the "two-digit number" of a specific candidate is displayed preferentially among the first hierarchy selection candidate groups belonging to the edit item "symbol B" (S06). So, in a case of the cable edit mode, it is not necessary to refer to the last selected candidate stored in the last selected candidate store region 121. Then, a candidate in the first hierarchy of the edit item "symbol B" is selected (S07), selections are made in the lower hierarchies (S08), and the cable edit screen 41b is displayed. In a similar fashion as the normal edit mode, stored values for respective selection candidate groups in the last selected candidate store region 121 are updated with the select operations in S07 and S08.

Though especially not shown, when the normal edit screen 41a is switched to the cable edit screen 41b and the cable key 31 is depressed, a cable length set screen is displayed before the cable edit screen 41b. In the cable length set screen, it is possible to select a length of the cable label L among a plurality of selection candidates (for example, "2.6 cm" and "5.0 cm"). The selection candidate group for the length of the cable label L shows the last selected candidate preferentially. The length of the cable label L may be set with a numerical entry in place of selecting from the selection candidate group.

Figure 6:
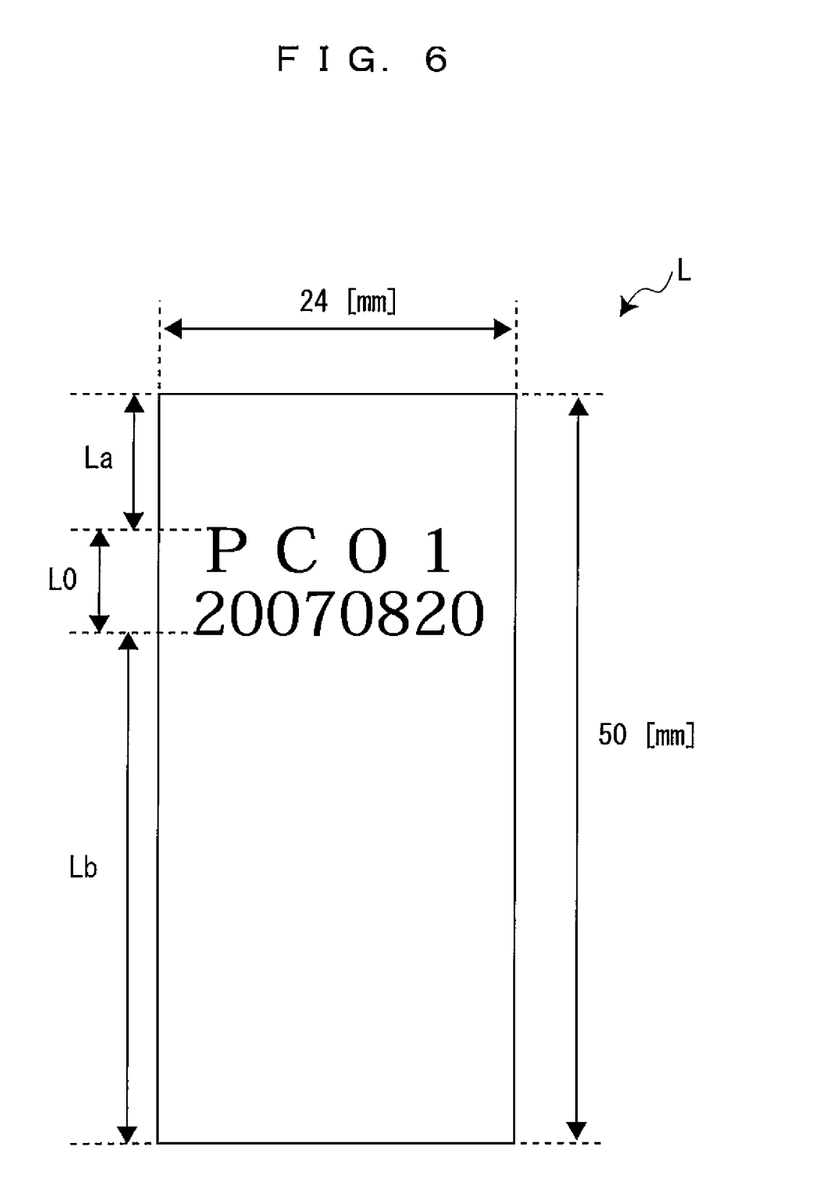
FIG. 6 is a plan view of a prepared cable label as an example.

Referring to FIG. 6, a print example of the cable label L prepared by editing the cable edit screen 41b will be described. In the example shown in FIG. 6, a print result is shown in which "PC01 (all are in full size)" is input on the first line and "20070820 (four two-digit number)" is input on the second line. Texts input of the two lines are printed in horizontal writing and along a tape width direction as a line direction. The rear end portion of the tape is cut off to be adjusted to a designated tape length. A length La from the top end of the tape to a print start position is fixed, and a length L0 from the print start position to a print end position varies depending on the number of lines. A length Lb from the print end position to the rear end of the tape is calculated by "a set tape length−(La+L0)".

Figure 7:
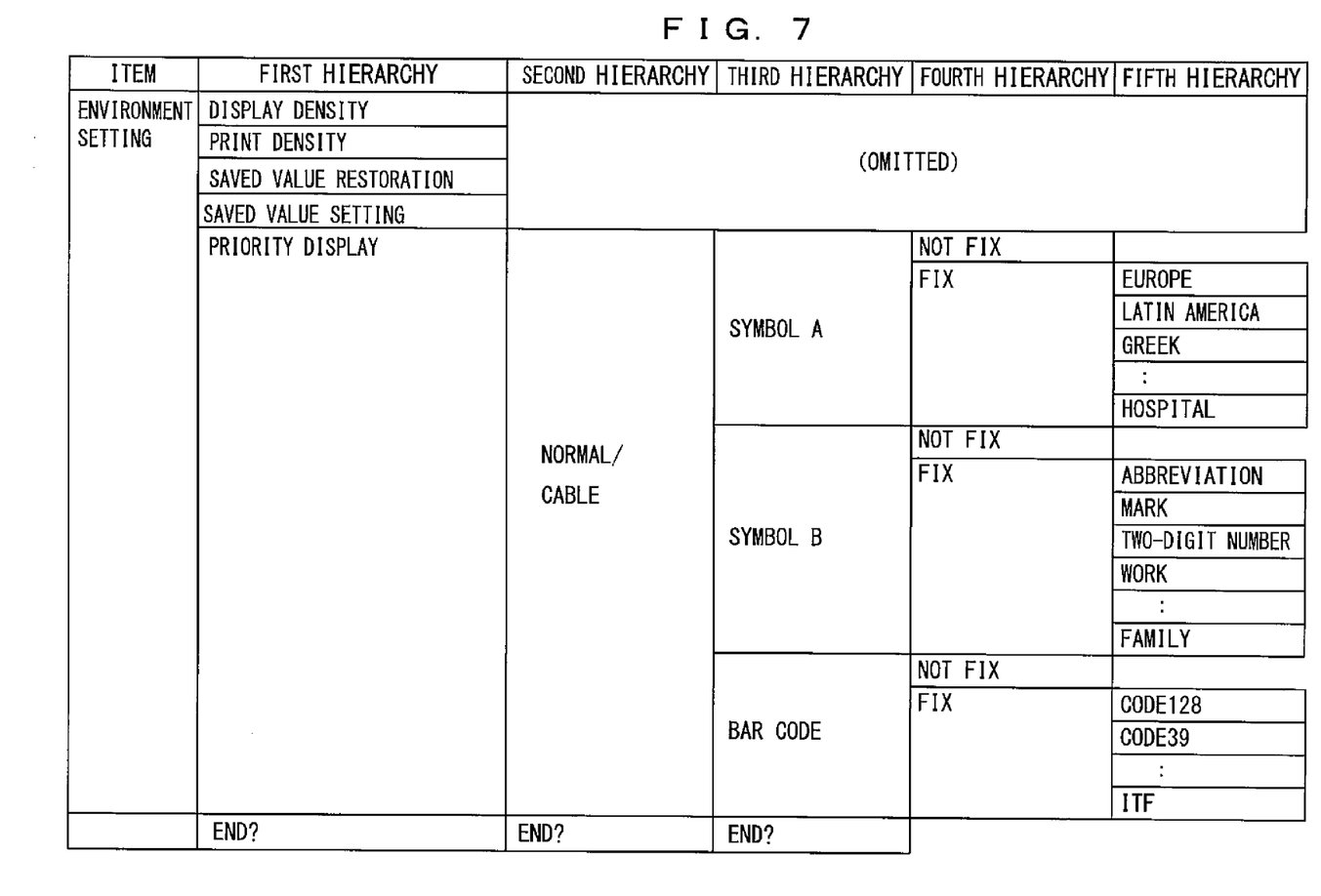
FIG. 7 is a table of selection candidates for an environment set function.
Figure 8:
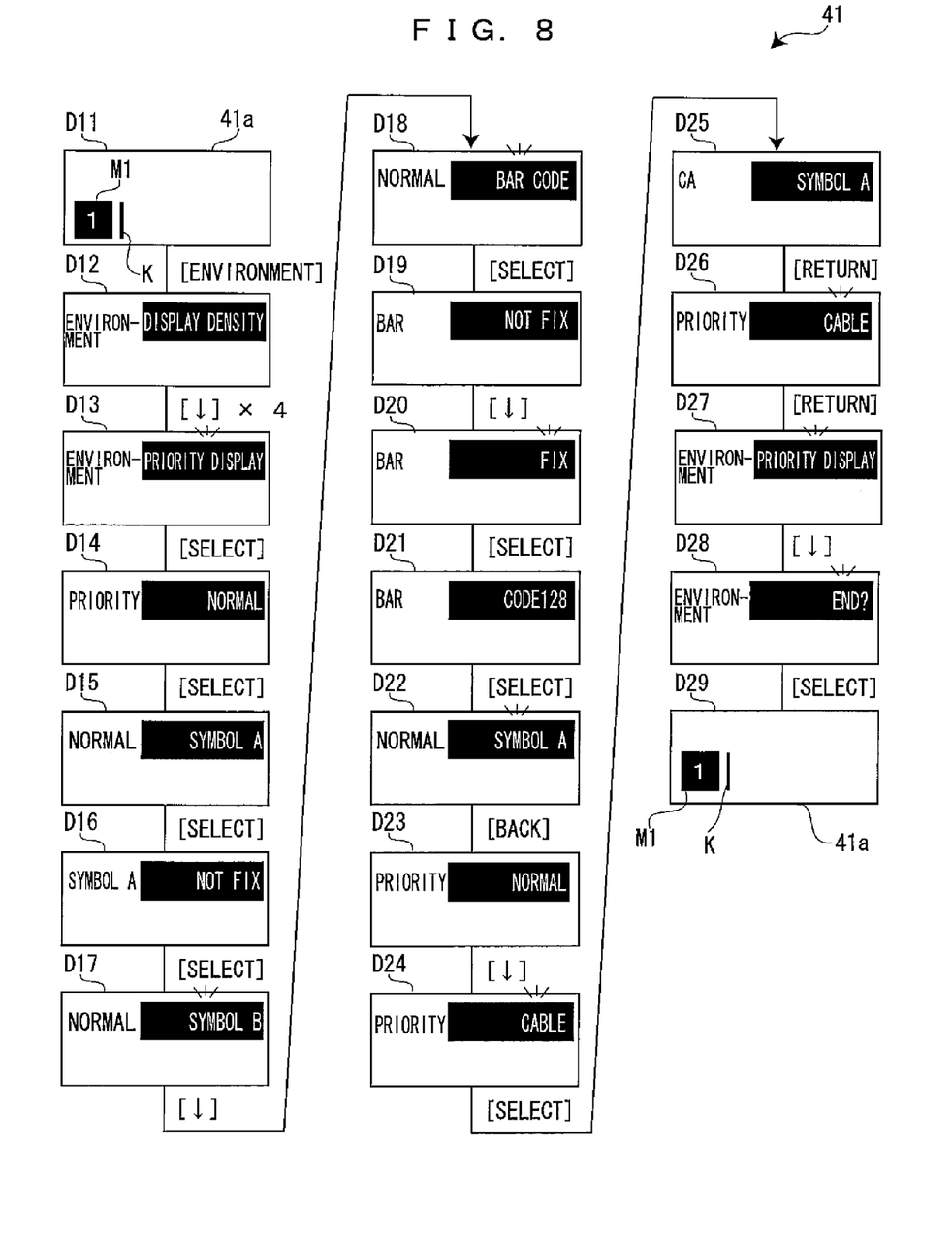
FIG. 8 is screen transition diagram showing a method of operation when a priority display setting in the environment set function is set.

An environment setting (especially, a priority display setting) will be explained with reference to FIGS. 7 and 8. FIG. 7 shows a table of selection candidates of the environment set function. In the environment setting, one of a "display density", a "print density", a "saved value restoration", a "saved value setting", and a "priority display" in the first hierarchy can be selected. As the former four options are not relevant to the invention, explanations therefor are omitted. In terms of the environment setting, the last selected candidates (the candidates read out from the last selected candidate store region 121) are displayed preferentially in the first and the second hierarchies, and the specific candidates (the default value showed on the top rank in each of the selection candidate groups) are displayed preferentially in or below the third hierarchy. When a temporary setting operation is performed in or below the third hierarchy and the second hierarchy is displayed again, a next candidate of the selected candidate is displayed preferentially. Details are described later.

As shown in the table of FIG. 7, for example, when the selection candidate "priority display" is selected in the first hierarchy, the edit mode (the normal edit mode or the cable edit mode) can be selected in the lower hierarchy (the second hierarchy). In the lower hierarchy (the third hierarchy) thereof, the edit item can be selected. In the lower hierarchy (the fourth hierarchy) thereof, the priority display type (a priority display variable type displaying the last selected candidate preferentially, or a priority display fixed type displaying the specific candidate preferentially) can be selected. In the lower hierarchy (the fifth hierarchy) thereof, "the specific candidate" in the priority display fixed type can be selected.

A priority display setting operation will be explained concretely with reference to FIG. 8. In the normal edit screen 41a (D11), when the environment key 33 is depressed, an environment set screen is displayed (D12). Screens shown in D13-D18 are also environment set screens. The environment set screen can be displayed from the cable edit screen 41b with the same operation.

In the environment set screen in D12, a title "environment" is displayed at an upper left side in the screen and the candidate "display density" on the top rank in the first hierarchy is highlighted at an upper right side in the screen. When the down (↓) key 35 is depressed four times, the candidate "priority display" is displayed blinkingly (D13). Then, when the return key 36 is depressed, the title "priority" is displayed at the upper left side in the screen, and the candidate "normal" on the top rank in the second hierarchy belonging to the candidate "priority display" is highlighted at the upper right side in the screen (D14). The "normal" refers to the normal edit mode.

When the return key 36 is depressed in the state of D14, the candidate "symbol A" on the top rank in the third hierarchy belonging to the candidate "normal" is highlighted (D15), and the return key 36 is depressed again, the candidate "not fix" on the top rank in the fourth hierarchy belonging to the candidate "symbol A" is highlighted (D16). The "not fix" refers to the priority display variable type. Then, when the return key 36 is depressed, a temporary setting is made such that "the last selected candidate is preferentially displayed when the edit item "symbol A" is selected in the normal edit mode". The temporary setting is set formally when the selection candidate "end?" is selected. The display screen 41 returns to the upper hierarchy and the second selection candidate "symbol B" in the third hierarchy is displayed blinkingly (D17). So, the selection candidate changes to the next candidate in the third hierarchy because the temporary setting has already been made.

When the down (↓) key 35 is once depressed in the state of D17, the third selection candidate "bar code" in the third hierarchy is displayed blinkingly (D18). If the "cable" in the second hierarchy is selected, only the selection candidates "symbol A" and "symbol B" are displayed in the third hierarchy, and the selection candidate "bar code" can not be selected. When the return key 36 is depressed in the state of D18, the title "bar" (an abbreviation of the bar code) is displayed at the upper left side in the screen and the candidate "not fix" on the top rank in the fourth hierarchy is highlighted at the upper right side in the screen (D19). When the down (↓) key 35 is once depressed, the second candidate "fix" in the fourth hierarchy is displayed blinkingly (D20). The "fix" refers to the priority display fixed type. In this state, when the return key 36 is depressed, the candidate "CODE 128" on the top rank in the fifth hierarchy is highlighted (D21). When the return key 36 is depressed again, a temporary setting is made in which "the specific candidate "CODE 128" is preferentially displayed when the edit item "bar code" is selected in the normal edit mode". The display screen 41 returns to the upper hierarchy (the third hierarchy) and the selection candidate "symbol A" as the next candidate of the selection candidate "bar code" is displayed blinkingly because the temporary setting has already been made.

In the state of D22, when the escape key is once depressed, the process returns from the third hierarchy to the second hierarchy, thereby the "normal" which is the selection candidate just before entering to the third hierarchy is highlighted (D23). When the down (↓) key 35 is once depressed, the second candidate "cable" in the second hierarchy is displayed blinkingly (D24). The "cable" refers to the cable edit mode. When the return key 36 is depressed, the title "ca" (an abbreviation of the cable edit mode) is displayed at the upper left side in the screen and the candidate "symbol A" on the top rank in the third hierarchy is highlighted at the upper right side in the screen (D25).

In the state of D 25, when the escape key is once depressed, the process returns from the third hierarchy to the second hierarchy, and then, the selection candidate "cable" just before entering in the third hierarchy is displayed blinkingly (D26). Further, the escape key is depressed in this state, the selection candidate "priority display" just before entering in the second hierarchy is displayed blinkingly (D 27). Then, when the down (↓) key 35 is once depressed, the last candidate "end?" in the first hierarchy is displayed blinkingly (D 28), and when the return key 36 is depressed, the normal display screen 41a is displayed (D 29). The formal setting of the content in the temporary setting is made with a depression of the return key 36 ("end?" has been selected). In other words, the content of the priority display setting which has been set temporarily is formally written in a given region (not shown) storing an environment setting value in the RAM 120.

As explained above, the tape printing apparatus 1 according to the embodiment determines which the priority display of the last selected candidates in selection candidate groups or the specific candidates should be made per edit content (edit screen, edit mode) in at least the default setting state. So, in a case that a possibility in which the specific candidate is selected is high, the specific candidate is displayed preferentially regardless of the last selected candidate, thereby it is possible to quickly select a desired candidate among the plurality of select candidates.

Further, it is possible to enhance convenience because the priority display type can be customized per edit mode (edit screen) or edit item with the environment setting according to the user's needs.

In the above embodiment, the last selected candidate is stored in the last selected candidate store region 121 per selection candidate group, but it is also possible to store by edit mode. For example, in the above embodiment, the last selected candidate is stored per selection candidate group. Therefore, when a candidate "Latin America" is selected among the selection candidate groups belonging to the edit item "symbol A" in the cable edit mode, and then the edit item "symbol A" is opened in the normal edit mode, the candidate "Latin America" is preferentially displayed. On the other hand, in a case that the last selected candidate is stored by edit mode, when the "Greek" in the edit item "symbol A" is selected in the cable edit mode, and then the "Latin America" in the edit item "symbol A" is selected in the normal edit mode, and further the edit item "symbol A" is opened in the cable edit mode, the last selected candidate "Greek" in the cable edit mode is preferentially displayed. It may be possible to let the user select whether the last selected candidates are stored by edit mode.

In the embodiment above, the priority display type is set for the selection candidate groups in the first hierarchy of the edit function. It is also possible to set the priority display type for the selection candidate groups in or below the second hierarchy.

In the embodiment above, two edit screens 41, one is the normal edit screen 41a and the other is the cable edit screen 41b, are exemplified. It may be possible to display equal to or more than three edit screens (edit modes) to be selected. The premise is that each of the edit screens 41 has at least different edit condition from one another.

In the embodiment above, the cable edit screen 41b has limitations for the number of lines and characters to be input compared with those of the normal edit screen 41a, but the limitations may be cancelled or changed by the user. A new edit screen may be formed other than the normal edit screen 41a and the cable edit screen 41b, and the user may set edit conditions (limitation contents for the number of input characters and the edit function) for a new edit screen.

In the embodiment above, the input functions for the symbol and the bar code as edit function are exemplified, but other edit functions can be applied with the invention. For example, in a case of editing such as character mode (typeface, decorated character, character enclosure, character interval), paragraph style (vertical writing/horizontal writing, character size, layout, outline box/listing), document form (fixed length printing, background pattern printing, margin) or the like, the priority display type may be set per selection candidates group.

In the embodiment above, the selection candidate group is displayed on a screen different from each of the edit screens (the edit screen transits from the edit screen to the select screen with the depression of edit item keys 32a, 32b or 32c), but the selection candidate group may be displayed on each of the edit screens, which means a part of the edit screen may be used as select screen.

In the embodiment above, the selection of the edit item is performed with the edit item keys 32a, 32b and 32c provided per item, but it may be possible that only one exclusive key is provided for selecting the edit item and the selection of the edit item is made on the select screen displayed by the depression of the exclusive key. In terms of switching for the edit mode, it may be also possible that the edit mode is selected from a plurality of selection candidates displayed in a mode select screen, rather than by the depression of the cable key 31.

In the embodiment above, that the cable label forming apparatus of the invention is applied to the tape printing apparatus 1 is exemplified, but it can be applied to any of electronic apparatuses (for example, a personal computer, etc) which display the selection candidate groups or with which the candidate selection operation is made.

All of the "plurality of selection candidates" in claims may be displayed simultaneously or these may be divided and displayed on the screen. For example, in the former case (all of the plurality of selection candidates are displayed on the screen), it is possible to display one of the plurality of candidates on a priority basis by displaying it on the top rank or highlighting (inverting, blinking, etc) it. In the latter case (for example, only one selection candidate is displayed on the screen because of the limitation of the screen size, etc), it is possible to display on a priority basis one of the plurality of selection candidates at the start on the screen.

The priority display with the "selection candidate display device (the selection candidate displaying)" is directed to a priority display method at least in the default setting state and does not prohibit a setting change of the priority display method of the environment settings in the embodiment above.

In the embodiment above, it is exemplified that the edit screen 41 transits to the select screen displayed with the plurality of selection candidates when the edit item key 32 is depressed (see FIG. 8), but it may be possible to display the plurality of selection candidates on the edit screen 41, which means that the part of the edit screen 41 may be used as select screen.

Also, it may be possible to provide each of the components of the tape printing apparatus 1 in the embodiment above as a program. Further, it may be possible to provide the program stored in various recording media (a CD-ROM, a flash memory, etc). In other words, the claimed invention includes a program with which a computer functions as each of the devices of the tape printing apparatus 1 and a recording medium in which the program is stored. It may be possible to modify the invention appropriately without departing from the scope thereof.

What is claimed is:

1. A cable label forming apparatus comprising:
   an edit screen display device which displays either one of a normal edit screen and a cable label forming edit screen for a label which is adhered to a cable and having an edit condition different from that of the normal edit screen;
   a selection candidate display instructing device which instructs displaying a plurality of selection candidates for performing at least one of a function selection and an input information selection in each of the edit screens;
   a selection candidate display device which displays the plurality of selection candidates according to the instruction of the selection candidate display instructing device;
   wherein the selection candidate display device displays a last selected candidate among the plurality of selection candidates on a priority basis in the normal edit screen when displaying the plurality of selection candidates is instructed, and displays a specific candidate among the plurality of selection candidates on a priority basis in the cable label forming edit screen when displaying the plurality of selection candidates is instructed; and
   a priority display type setting device which sets either one of a priority display fixed type displaying the specific candidate among the plurality of selection candidates on a priority basis and a priority display variable type displaying the last selected candidate among the plurality of selection candidates on a priority basis in each of the edit screens, wherein the selection candidate display device displays on a priority basis based on a setting of the priority display type setting device when the plurality of selection candidates are displayed in a case that the priority display type setting device is set.

2. The cable label forming apparatus according to claim 1, wherein the plurality of selection candidates are prepared by item, the selection candidate display instructing device is capable of instructing to display the plurality of selection candidates by designating either one of items, and the priority display type setting device sets the priority display fixed type or the priority display variable type by item.

3. The cable label forming apparatus according to claim 1, wherein the priority display type setting device further sets the specific candidate in a case that the priority display fixed type is set.

4. The cable label forming apparatus according to claim 1, wherein the selection candidate display instructing device is capable of instructing to display a plurality of lower selection candidates as a lower hierarchy corresponding to the selected candidate by a selection operation in which one of candidates is selected among the plurality of selection candidates, and the selection candidate display device displays the last selected candidate on a priority basis for the plurality of lower selection candidates regardless of the priority display type of the edit screen with which display instruction for the plurality of selection candidates is made.

5. A tape printing apparatus comprising: each of devices in the cable label forming apparatus as set forth in claim 1;

a print data generating device which generates a print data based on an edit result in each of edit screens; and a print device which prints the print data on a tape.

6. The tape printing apparatus according to claim 5, wherein the plurality of selection candidates are symbol menus of a plurality of types, and the specific candidate is a candidate which is used for inputting two-digit number capable of processing two-digit number as one character.

7. A cable label forming method for a cable label forming apparatus displaying at least two types of edit screens having different edit conditions, the cable label forming apparatus executing:

edit screen setting which sets either one of the two types of edit screens, and selection candidate displaying which displays a plurality of selection candidates for performing at least one of a function selection and an input information selection in each of the edit screens;

wherein a last selected candidate is displayed on a priority basis among the plurality of selection candidates when the plurality of selection candidates are displayed in one of the two types of the edit screens, and a specific candidate is displayed on a priority basis among the plurality of selection candidates when the plurality of selection candidates are displayed in the other of the two types of the edit screens in the selection candidate displaying; and priority display type setting which sets either one of a priority display fixed type displaying the specific candidate among the plurality of selection candidates on a priority basis and a priority display variable type displaying the last selected candidate among the plurality of selection candidates on a priority basis in each of the two types of edit screens, wherein the selection candidate displaying displays on a priority basis based on the priority display type setting when the plurality of selection candidates are displayed in a case that the priority display type setting is set.

8. A program embodied on a non-transitory storage medium causing a computer to function as respective steps in the cable label forming method of the cable label forming apparatus according to claim 7.

\* \* \* \* \*